O. WILKINS AND W. E. MOODY.
LOADING MACHINE.
APPLICATION FILED JUNE 16, 1919.

1,361,653.

Patented Dec. 7, 1920.

Inventors
Orley Wilkins,
William E. Moody.

By C. C. Shepherd
Attorney

UNITED STATES PATENT OFFICE.

ORLEY WILKINS AND WILLIAM E. MOODY, OF COLUMBUS, OHIO, ASSIGNORS TO JAMES ELLWOOD JONES, OF SWITCHBACK, WEST VIRGINIA.

LOADING-MACHINE.

1,361,653.  Specification of Letters Patent.  Patented Dec. 7, 1920.

Application filed June 16, 1919. Serial No. 304,478.

*To all whom it may concern:*

Be it known that we, ORLEY WILKINS and WILLIAM E. MOODY, citizens of the United States, residing at Columbus, in the county of Franklin and State of Ohio, have invented certain new and useful Improvements in Loading-Machines, of which the following is a specification.

This invention relates to improvements in mining machinery, and has particular reference to an improved vehicle for effecting the loading of coal into suitable carriers.

The general object of the present invention resides in the provision of a coal loading machine wherein is employed a wheeled base unit and a vertically adjustable conveyer structure, which is mounted upon said base unit, and wherein improved means are provided for easily and conveniently effecting the raising and lowering of the conveyer structure relative to the base unit in a simple and labor-saving manner.

The invention has particular reference to a loading machine of the type disclosed in the copending application of N. A. Newdick *et al.*, bearing Serial No. 302,914 and filing date of June 9, 1919, and specifically includes the provision of a balancing spring structure, which is adapted to be interposed between the bast unit and the vertically adjustable conveyer frame, said spring structure being ancillary to the manually operated means for raising and lowering the frame, so that said frame in a measure will be balanced by the spring structure in order that its vertical movements may be accomplished with ease and facility.

For a further understanding of the invention, reference is to be had to the accompanying drawings, forming a part of this specification, and in which similar characters of reference denote like and corresponding parts throughout all of the views thereof, and in which.

Figure 1:
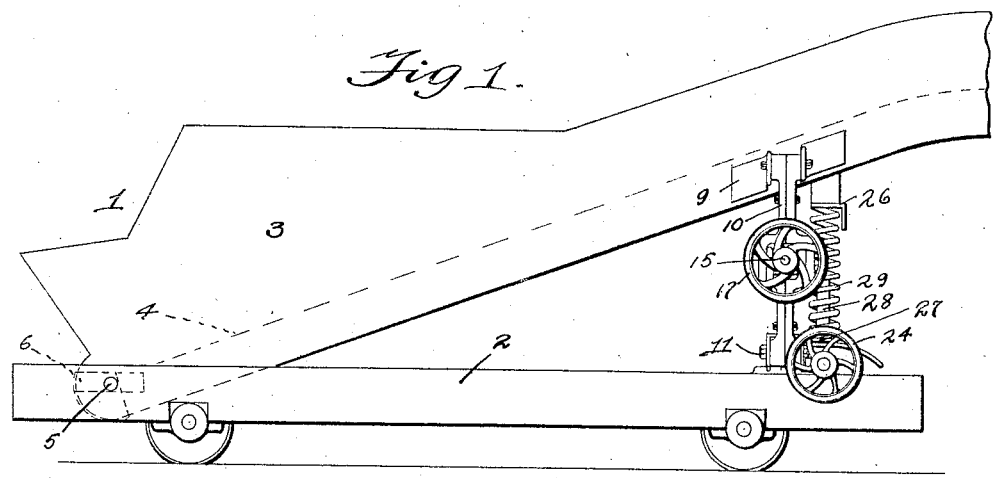
Figure 1 is a side elevation of a coal loading machine and illustrating the application of the spring structure comprising the present invention thereto.
Figure 2:
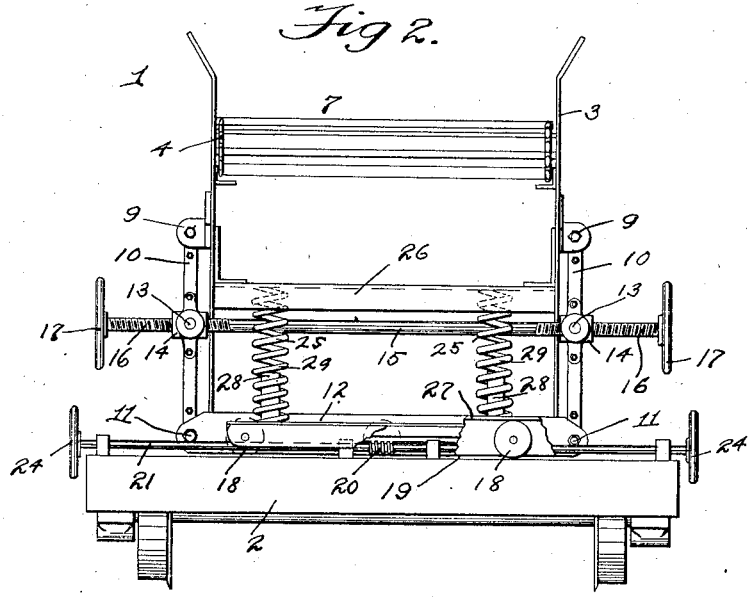
Fig. 2 is an end elevation thereof.

Referring more particularly to the details of the present invention, use is made of a loading machine 1, which is of the type illustrated in the above mentioned application, and embodies a wheeled frame or base unit 2, upon which is mounted a hopper 3, the latter being adapted to receive coal or other suitable material and to convey the same to a suitable point of discharge. To this end the bottom of the hopper is provided with an endless conveyer 4 which leads out of the hopper so as to effect the discharge of the material from the latter. The hopper 3 is pivotally connected with the frame 2 by providing the same with a forwardly located stud shaft 5, which is slidably positioned within pockets 6 formed in the frame 2, said shaft 5 serving as a vertical fulcrum for the hopper 3 and owing to the width of the pocket 6, lateral movement of the hopper may be effected. Thus it will be manifest that the hopper will be permitted to oscillate vertically with respect to said frame and may also be moved laterally thereof. In this manner the discharge end 7 of said hopper may be positioned to effect the discharge of coal therefrom at any appropriate point. A suitable motor (not shown) may be provided for effecting the operation of the conveyer.

To raise and lower the hopper 3, the latter is provided on opposite sides with fixed brackets 9, which are arranged to pivotally receive the upper ends of a pair of toggle members 10, the lower ends of said toggle members being pivoted as at 11 with a laterally movable frame 12. The intermediate portions of said toggle members are pivotally connected as at 13 and are further provided with internally threaded nuts 14 which are adapted to receive a transversely extending shaft 15. This shaft is reversely threaded as indicated at 16 for engagement with the nuts 14, whereby upon the rotation of said shaft, said toggle members may be oscillated either inwardly or outwardly and in this manner the height of the discharge end of said conveyer may be readily governed. The ends of the shaft 15 are equipped with hand wheels 17 in order that the rotation of said shaft may be manually effected.

The frame 12 carries rollers 18, which operate over an arcuate track-way 19 rigidly positioned upon the upper surface of the frame 2, and the frame 12 is also provided with a segmental gear section 20 along its rear face. A shaft 21 is rotatably mounted in bearings 22 carried by the frame 2 and is provided with a worm 23, which meshes with the teeth of the section 20, whereby upon the rotation of the shaft 21, said frame 12 may be laterally shifted and corresponding movement hence imparted to the hopper 3 by reason of the toggle structure 10. Hand wheels 24 are provided upon the ends of the shaft 21 to permit of its rotational movement. The structure so far described is to be found in the above mentioned application and therefore the same does not specifically form a part of the claimed subject matter of the present application.

Referring now to the present invention, it has been found that considerable difficulty has been encountered in effecting the rotation of the shaft 15, owing to the fact that the weight of the hopper bears heavily upon the nuts 14 so that considerable friction exists between the latter and the threaded portions 16 of said shaft. To relieve this friction and to counterbalance substantially the weight of the hopper 3 so that its raising and lowering may be easily accomplished, the present invention includes the provision of an improved spring structure 25, which is adapted to be interposed between the hopper and the frame 2 so as to absorb the weight of said hopper and to relieve the stress placed upon the members 14. To this end the under side of the hopper 3 is equipped with a transversely extending rigidly connected angle member 26, and the frame 12 is also provided with a similarly connected and coöperating angle member 27, which latter being provided with upstanding studs 28. Surrounding said studs and positioned between the angle members 26 and 27 is a pair of relatively strong coiled springs 29 which are of the expansible type and normally tend to force the hopper 3 upwardly.

From the foregoing it will be apparent that upon the rotation of the shaft 15 and the consequent adjustment of toggle members 10, the weight of said hopper will be largely received by the springs 29, and in this manner the frictional pressure upon the members 14, caused by the weight of said hopper, will be eliminated. This permits the shaft 15 to be readily rotated without the exercise of considerable manual effort and renders the adjustment of the discharge end of the hopper 3 easy to effect.

We claim:

1. In a loading machine, the combination with a wheeled base unit, of a conveyer frame pivotally mounted upon said base unit, toggle mechanism connected with said base unit and with said frame to effect the raising and lowering of the latter, and a resilient structure interposed between said frame and said base unit to facilitate the operation of said toggle mechanism.

2. In a loading machine, the combination with a wheeled base unit, a hopper having its forward end pivotally connected with said base unit, toggle mechanism connected with said hopper and with said base unit for regulating the vertical movements of the hopper, and a plurality of coiled springs interposed between said hopper and said base unit and serving to relieve the toggle mechanism of the weight of said hopper.

3. In a loading machine, the combination with a wheeled base unit, of a hopper having its forward end movably connected with said base unit to permit said hopper to be either vertically or laterally oscillated, means for vertically adjusting said hopper, comprising a pair of toggle members located on opposite sides of said hopper, means for securing the upper ends of said toggle members with said hopper, a frame movable laterally upon said base unit, means for connecting the lower ends of said toggle members with said frame, a support formed with said frame, and a pair of springs interposed between said support and the lower side of said hopper and serving to relieve said toggle members of the weight of said hopper.

In testimony whereof we affix our signatures.

ORLEY WILKINS.
WILLIAM E. MOODY.